No. 823,472. PATENTED JUNE 12, 1906.
R. KNIETSCH.
PROCESS OF MAKING SULFURIC ANHYDRID.
APPLICATION FILED FEB. 18, 1901.
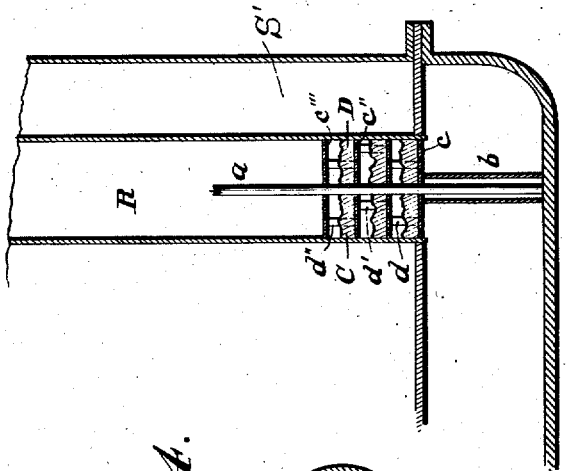
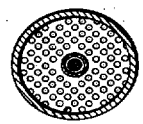
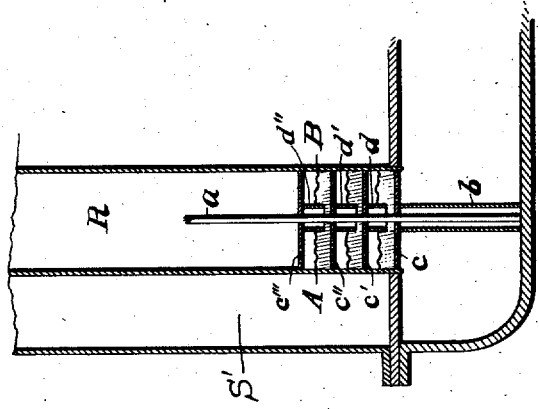

UNITED STATES PATENT OFFICE.

RUDOLF KNIETSCH, OF LUDWIGSHAFEN-ON-THE-RHINE, GERMANY, ASSIGNOR, BY MESNE ASSIGNMENTS, TO GENERAL CHEMICAL COMPANY, A CORPORATION OF NEW YORK.

PROCESS OF MAKING SULFURIC ANHYDRID.

No. 823,472.      Specification of Letters Patent.      Patented June 12, 1906.

Original application filed August 6, 1898, Serial No. 687,912. Divided and this application filed February 18, 1901. Serial No. 47,730.

*To all whom it may concern:*

Be it known that I, RUDOLF KNIETSCH, a subject of the German Emperor, and a resident of Ludwigshafen-on-the-Rhine, Germany, have invented a certain new and useful Process of Making Sulfuric Anhydrid, of which the following is a specification.

In United States Letters Patent No. 652,119, granted June 19, 1900, on an application filed July 14, 1898, Serial No. 685,969, I stated as follows: "The reaction between sulfur dioxid and oxygen only takes place at an elevated temperature, so that it is necessary to submit the gases either separately or in admixture to a preliminary heating. Such heat was applied by exposing the tubes to a low red heat maintained in a surrounding heated chamber from a furnace, as shown in Rath's German Patent No. 22,118, of 1883, or in Ellice-Clarke's English Patent No. 3,166, of 1888, or in Haenisch and Schroeder's United States Patent No. 384,841, of 1888, or in Stark's English Patent No. 12,028, of 1889. During the reaction the heat of chemical union becomes added to that applied, and thus the temperature at the zone of maximum reaction may rise to an enormous degree, even to a bright red heat, according to the richness in sulfur dioxid of the gas mixture or to the strength of the current of the gases, or both."

In my said patent I also described means whereby instead of maintaining the oven or chamber in which the combination takes place at a low red heat I cooled the contents of said chamber in such manner that the heat at the zone of maximum or ultimate reaction therein—*i. e.*, the reaction that determines the percentage of $SO_3$ in the final product—was kept below the decomposing-heat of $SO_3$.

One feature of my present invention consists of an improved method of conducting such process so that said zone of maximum or ultimate reaction shall be kept substantially below said decomposing temperature, and the advantages hereof show themselves in two directions.

In the first place the division of the catalytic material, as hereinafter described, into independently-supported sections, each extending all the way across the passage for the gases being converted, while still compelling the gas to pass equably through the catalytic material, prevents the packing of the material, and thereby enables the gases to be passed through without undue pressure. In the next place the division of the catalytic material into sections presents to the cooling action, for the removal of the excess of heat, a material which is diffused by having intervening spaces between said sections wherein the gases partially converted by one section of the material are under cooling action while passing to the next section of material, thus producing the catalytic heat in instalments and giving said cooling action a better opportunity to remove the excess of heat due to the catalytic action than where said heat is generated all at once in a continuous mass of material.

In said Patent No. 652,119 I have shown various forms of apparatus containing a contact-chamber, a passage adjacent to said chamber for a cooling fluid whereby the excess of heat due to the reaction is removed, and means for controlling the cooling capacity thereof.

In the accompanying drawings, Figure 1 represents the contact-chamber R of said Patent, No. 652,119 in vertical section with the contact material arranged for carrying out my present process, said contact-chamber being contiguous to a flue or passage S', through which the cooling medium travels, substantially as described in said patent. Fig. 2 is the same thing, excepting that it contains another form of support for the contact material. Fig. 3 is a horizontal section on the line A B of Fig. 1 with the contact material removed. Fig. 4 is a horizontal section on the line C D of Fig. 2 with the contact material removed.

Although I do not wish to be understood as limiting myself to the form of apparatus whereby my present process may be carried out, I will now proceed to describe a desirable form of apparatus for that purpose in order the better to enable a man skilled in the art to practice my present process.

In my present apparatus the tubes containing the said contact material are divided up into a number of compartments by the insertion in any suitable way of a number of perforated plates or sieves, and upon each plate a layer of contact material is placed sufficient to cover up the plate from wall to wall, including perforations and the opening between the periphery of the plate and the wall of the tube. With a tube of about four-inch diameter and a space between plates of about one inch each layer may consist of about ten grams of ten-per-cent. platinized asbestos. The principle is that the several layers shall be relieved in whole or in part of pressure from each other, while the gas shall have no other course than through the contact mass.

Referring now to the accompanying drawings, $a$ is an iron rod suitably supported at the bottom of a contact-tube R and passing up its central line. Over this rod a narrow tube $b$ may be placed, reaching up the rod to the elevation of the lower end of the contact mass in the contact-tube. The first perforated plate $c$ is then passed down the contact-tube over the rod $a$ and rests upon the narrow tube $b$. Upon this plate $c$ sufficient platinized asbestos or similar contact mass is placed to cover up the perforations and periphery, as aforesaid. Next a bead or short piece of narrow tube $d$ is passed down the contact-tube over the rod $a$ until it is supported by the perforated plate $c$ or a portion of the contact material resting thereon. Next another perforated plate $c'$ is placed in position to rest on the bead $d$ and is covered by a layer of contact material. This process is continued until the contact-tube is sufficiently charged. The length of the beads regulates the distance apart of the contact mass layers, and this can be varied at will. In this construction each layer of asbestos rests upon its plate, and this pressure is transferred to the beads and the narrow tube $b$, so that the asbestos as a whole is substantially relieved from pressure and the gas is subjected to successive catalytic and non-catalytic action, the catalytic action taking place as it passes through the layers of catalytic material and the non-catalytic action occurring as it passes through the plates or spaces by which such layers are separated. Of course other means can be adopted, provided that the principles above stated be observed. Thus the perforated plates can be supported by tripods $D^3 D^4 D^5$ instead of by the narrow tubes or beads strung upon the central rod.

It will be observed that in my process the gaseous mixture containing $SO_2$ and O is first subjected to catalytic action sufficient to effect only a partial conversion into $SO_3$. Then the catalytic process is discontinued, to be resumed as soon as the mixture reaches the next catalytic layer, and thus periods of catalytic action and of comparative freedom from chemical activity succeed each other until the desired conversion percentage has been attained. This "frictional" or instalment process of catalytic action yields much better results than the continuous or single-step process previously employed, for the reason that a partial conversion produces a much lower degree of heat and not only prolongs the life of the platinum contact mass, but renders the effect of the cooling agency much more rapid and certain. This cooling agency operates during the periods of interruption which intervene between the successive catalytic instalments, and therefore at a time when no chemical action occurs to counteract the cooling influence, so that the latter is all the more energetic. Furthermore, the cooling also takes place during the catalytic instalments, so that the excess of heat due to the reaction is removed both during the catalytic process proper and during the intervals between the catalytic instalments.

In the particular case illustrated by the drawings the cooling agency is applied externally to the vessel in which the gases are contained during such catalytic instalments and intervening interruptions, so that the cooling agent is not mixed in any way with the gases undergoing conversion.

This application is filed as a division of application, Serial No. 687,912, filed August 6, 1898, in which the apparatus herein described is claimed. Therefore the process and not said apparatus is claimed herein.

I claim—

1. The process of manufacturing sulfuric anhydrid which consists in subjecting gas containing sulfur dioxid and oxygen to successive contacts with separated bodies of contact material by which the conversion is effected in instalments while maintaining the zone of ultimate reaction substantially below the decomposing temperature of $SO_3$ by a cooling action intermediate between said contacts.

2. The process of manufacturing sulfuric anhydrid which consists in subjecting gas containing sulfur dioxid and oxygen to successive contacts with separated bodies of contact material by which the conversion is effected in instalments while maintaining the zone of ultimate reaction substantially below the decomposing temperature of $SO_3$ by a cooling action both intermediate between and during said contacts.

3. The process of manufacturing sulfuric anhydrid which consists in subjecting gas containing sulfur dioxid and oxygen to successive contacts with separated bodies of contact material by which the conversion is effected in instalments while maintaining the pressure at substantially that of the atmosphere or below and while maintaining the zone of ultimate reaction substantially below the decomposing temperature of $SO_3$ by cooling action intermediate between said contacts.

4. The process of making sulfuric anhydrid which consists in passing a gas containing sulfur dioxid and oxygen through separated bodies of contact material by which the conversion is effected in instalments while removing from the gases intermediate between said contacts excess of heat due to the reaction.

5. The process of manufacturing sulfuric anhydrid which consists in subjecting gas containing $SO_2$ and O to successive contacts with separated bodies of contact material by which the conversion is effected in instalments while maintaining the zone of ultimate reaction substantially below the decomposing temperature of $SO_3$ by an external cooling action intermediate between the said contacts.

6. The process of manufacturing sulfuric anhydrid which consists in subjecting gas containing $SO_2$ and O to successive contacts with separated bodies of contact material by which the conversion is effected in instalments while maintaining the zone of ultimate reaction substantially below the decomposing temperature of $SO_3$ by an external cooling action both intermediate between and during said contacts.

7. The process of manufacturing sulfuric anhydrid which consists in subjecting gas containing $SO_2$ and O to successive contacts with separated bodies of contact material by which the conversion is effected in instalments while maintaining the pressure at substantially that of the atmosphere or below, and while maintaining the zone of ultimate reaction substantially below the decomposing temperature of $SO_3$ by an external cooling action intermediate between said contacts.

8. The process of making sulfuric anhydrid which consists in passing a gas containing $SO_2$ and O through separated bodies of contact material by which the conversion is effected in instalments while removing from the gases intermediate between said contacts, excess of heat due to the reaction, by external cooling.

9. The process of making sulfuric anhydrid, which consists in subjecting a gaseous mixture containing $SO_2$ and O to catalytic action sufficient to effect only a partial conversion into $SO_3$, then discontinuing the catalytic action, and after such interruption again subjecting the mixture to catalytic action to continue the conversion into $SO_3$.

10. The process of making sulfuric anhydrid, which consists in subjecting a gaseous mixture containing $SO_2$ and O to catalytic action sufficient to effect only a partial conversion into $SO_3$, then discontinuing the catalytic action and cooling the partially-converted mixture during such period of interruption, and thereupon again subjecting the mixture to catalytic action to carry the conversion further.

11. The process of making sulfuric anhydrid, which consists in subjecting a gaseous mixture containing $SO_2$ and O to catalytic action sufficient to effect only a partial conversion into $SO_3$, and simultaneously employing a cooling agency to remove heat due to the catalytic reaction, then discontinuing the catalytic action while still continuing the cooling action, and after such interruption again subjecting the mixture to catalytic action to continue the conversion into $SO_3$ while at the same time continuing the cooling action to remove heat due to this second catalytic reaction.

12. The process of making sulfuric anhydrid which consists in subjecting a gaseous mixture containing $SO_2$ and O to catalytic action sufficient to effect only a partial conversion into $SO_3$, then discontinuing the catalytic action, and during such interruption cooling the gaseous mixture by an externally-applied agent kept separated from the said gaseous mixture, and after such interruption subjecting the resulting mixture of partially-converted and unconverted gases, in its original amount, to catalytic action to continue the conversion into $SO_3$.

In testimony whereof I have hereunto set my hand in the presence of two subscribing witnesses.

RUDOLF KNIETSCH.

Witnesses:
ERNEST F. EHRHARDT,
JACOB ADRIAN.

It is hereby certified that in Letters Patent No. 823,472, granted June 12, 1906, upon the application of Rudolf Knietsch, of Ludwigshafen-on-the-Rhine, Germany, for an improvement in "Processes of Making Sulfuric Anhydrids," an error appears in the printed specification requiring correction, as follows: In line 64, page 2, the word "frictional" should read *fractional;* and that the said Letters Patent should be read with this correction therein that the same may conform to the record of the case in the Patent Office.

Signed and sealed this 3d day of July, A. D., 1906.

[SEAL.]

E. B. MOORE,
*Acting Commissioner of Patents.* which consists in passing a gas containing sulfur dioxid and oxygen through separated bodies of contact material by which the conversion is effected in instalments while removing from the gases intermediate between said contacts excess of heat due to the reaction.

5. The process of manufacturing sulfuric anhydrid which consists in subjecting gas containing $SO_2$ and O to successive contacts with separated bodies of contact material by which the conversion is effected in instalments while maintaining the zone of ultimate reaction substantially below the decomposing temperature of $SO_3$ by an external cooling action intermediate between the said contacts.

6. The process of manufacturing sulfuric anhydrid which consists in subjecting gas containing $SO_2$ and O to successive contacts with separated bodies of contact material by which the conversion is effected in instalments while maintaining the zone of ultimate reaction substantially below the decomposing temperature of $SO_3$ by an external cooling action both intermediate between and during said contacts.

7. The process of manufacturing sulfuric anhydrid which consists in subjecting gas containing $SO_2$ and O to successive contacts with separated bodies of contact material by which the conversion is effected in instalments while maintaining the pressure at substantially that of the atmosphere or below, and while maintaining the zone of ultimate reaction substantially below the decomposing temperature of $SO_3$ by an external cooling action intermediate between said contacts.

8. The process of making sulfuric anhydrid which consists in passing a gas containing $SO_2$ and O through separated bodies of contact material by which the conversion is effected in instalments while removing from the gases intermediate between said contacts, excess of heat due to the reaction, by external cooling.

9. The process of making sulfuric anhydrid, which consists in subjecting a gaseous mixture containing $SO_2$ and O to catalytic action sufficient to effect only a partial conversion into $SO_3$, then discontinuing the catalytic action, and after such interruption again subjecting the mixture to catalytic action to continue the conversion into $SO_3$.

10. The process of making sulfuric anhydrid, which consists in subjecting a gaseous mixture containing $SO_2$ and O to catalytic action sufficient to effect only a partial conversion into $SO_3$, then discontinuing the catalytic action and cooling the partially-converted mixture during such period of interruption, and thereupon again subjecting the mixture to catalytic action to carry the conversion further.

11. The process of making sulfuric anhydrid, which consists in subjecting a gaseous mixture containing $SO_2$ and O to catalytic action sufficient to effect only a partial conversion into $SO_3$, and simultaneously employing a cooling agency to remove heat due to the catalytic reaction, then discontinuing the catalytic action while still continuing the cooling action, and after such interruption again subjecting the mixture to catalytic action to continue the conversion into $SO_3$ while at the same time continuing the cooling action to remove heat due to this second catalytic reaction.

12. The process of making sulfuric anhydrid which consists in subjecting a gaseous mixture containing $SO_2$ and O to catalytic action sufficient to effect only a partial conversion into $SO_3$, then discontinuing the catalytic action, and during such interruption cooling the gaseous mixture by an externally-applied agent kept separated from the said gaseous mixture, and after such interruption subjecting the resulting mixture of partially-converted and unconverted gases, in its original amount, to catalytic action to continue the conversion into $SO_3$.

In testimony whereof I have hereunto set my hand in the presence of two subscribing witnesses.

RUDOLF KNIETSCH.

Witnesses:
ERNEST F. EHRHARDT,
JACOB ADRIAN.

It is hereby certified that in Letters Patent No. 823,472, granted June 12, 1906, upon the application of Rudolf Knietsch, of Ludwigshafen-on-the-Rhine, Germany, for an improvement in "Processes of Making Sulfuric Anhydrids," an error appears in the printed specification requiring correction, as follows: In line 64, page 2, the word "frictional" should read *fractional;* and that the said Letters Patent should be read with this correction therein that the same may conform to the record of the case in the Patent Office.

Signed and sealed this 3d day of July, A. D., 1906.

[SEAL.]

E. B. MOORE,
*Acting Commissioner of Patents.*

It is hereby certified that in Letters Patent No. 823,472, granted June 12, 1906, upon the application of Rudolf Knietsch, of Ludwigshafen-on-the-Rhine, Germany, for an improvement in "Processes of Making Sulfuric Anhydrids," an error appears in the printed specification requiring correction, as follows: In line 64, page 2, the word "frictional" should read *fractional;* and that the said Letters Patent should be read with this correction therein that the same may conform to the record of the case in the Patent Office.

Signed and sealed this 3d day of July, A. D., 1906.

[SEAL.]

E. B. MOORE,
*Acting Commissioner of Patents.*